United States Patent [19]
Brady

[11] 3,910,106
[45] Oct. 7, 1975

[54] TRANSDUCER

[75] Inventor: Edward R. Brady, Sierra Madre, Calif.

[73] Assignee: International Telephone and Telegraph Corporation, New York, N.Y.

[22] Filed: Nov. 27, 1974

[21] Appl. No.: 527,659

[52] U.S. Cl. ........ 73/88.5 R; 73/141 A; 73/398 AR; 73/393
[51] Int. Cl.² .................... G01L 1/22; G01B 7/18
[58] Field of Search ...... 73/398 AR, 88.5 R, 407 R, 73/141 A, 88.5 SD, 393

[56] References Cited
UNITED STATES PATENTS
2,729,730   1/1956   Brady ............................ 73/398 AR
3,722,264   3/1973   Talmo ............................ 73/398 AR

*Primary Examiner*—S. Clement Swisher
*Assistant Examiner*—Denis E. Corr
*Attorney, Agent, or Firm*—A. Donald Stolzy

[57] ABSTRACT

A static pressure compensated transducer wherein two leaf spring cantilever beams are located in the same chamber. Each beam has a strain gage glass bonded to each side thereof. One beam is deflected by a differential pressure unit (DPU) while the other is left without any deflection. The strain gages are then connected in a Wheatstone bridge and the bridge output is directly proportional to the one beam deflection and independent of the fluid pressure in the chamber. The bridge output is thus more accurate than prior art bridge outputs.

6 Claims, 4 Drawing Figures

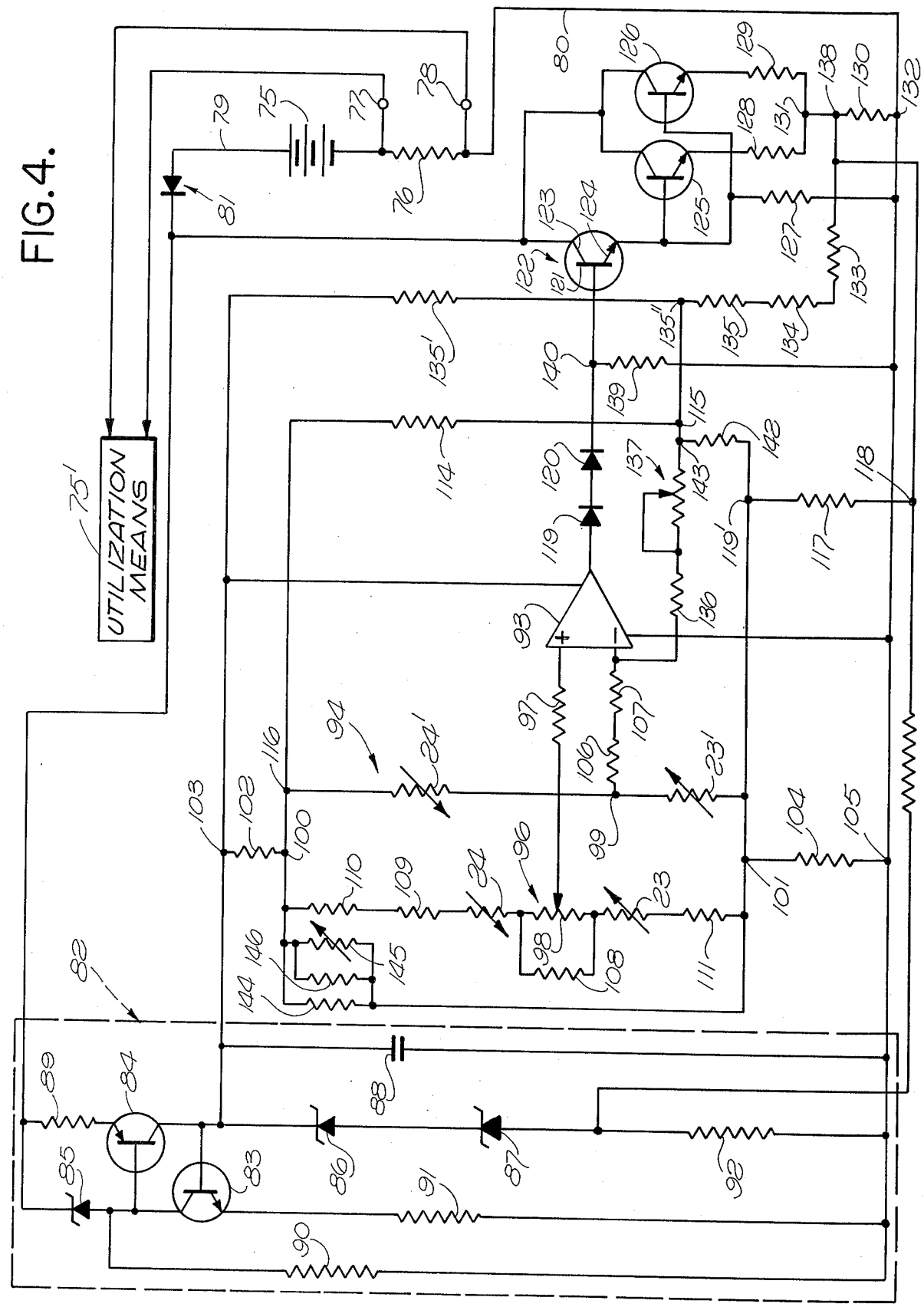

TRANSDUCER

BACKGROUND OF THE INVENTION

This invention relates to the energy conversion art, and more particularly to a static pressure compensated transducer.

In the past, leaf spring cantilever beams have been used with strain gage bridges in connection with pressure or force transducers. These transducers have been subject to inaccuracies because of variations in the static pressure of the fluid which surrounds the beams and strain gages. See U.S. Pat. No. 3,722,264.

SUMMARY OF THE INVENTION

In accordance with the device of the present invention, the above-described and other disadvantages of the prior art are overcome by placing an additional stationary beam with the usual one in the same chamber therewith, attaching two additional strain gages to the additional beam, and connecting the additional strain gages in the bridge circuit.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 4 is a schematic diagram of a circuit employed with the transducer shown in FIGS. 1, 2 and 3.

DESCRIPTION OF THE PREFERRED EMBODIMENT

Figure 1:
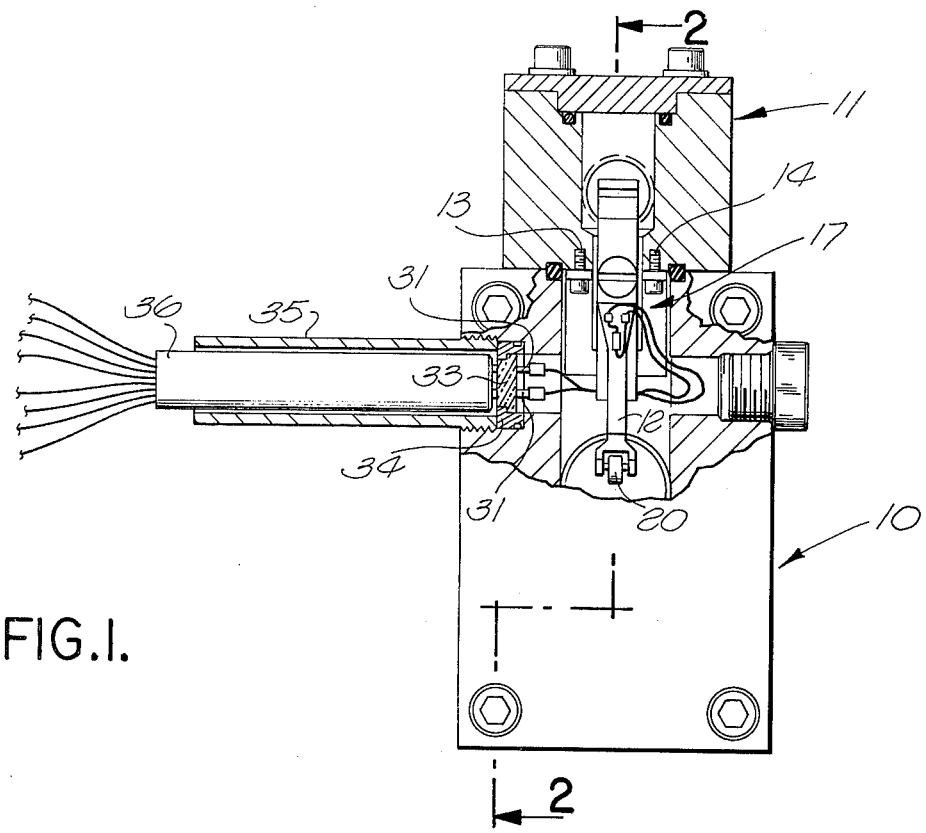
FIG. 1 is an end elevational view, partly in section, of a transducer constructed in accordance with the present invention.

In the drawings, in FIG. 1, a transducer is indicated at 10 having a central body portion 11 housing an adjustable mounting for two cantilever leaf spring strain gage beams 12 and 12', beam 12' being hidden in the view of FIG. 1. Screws 13 and 14 hold upper ends 15 and 16 of a U-shaped member 17 in a fixed position relative to body 11 as shown in FIGS. 1 and 3.

Figure 2:
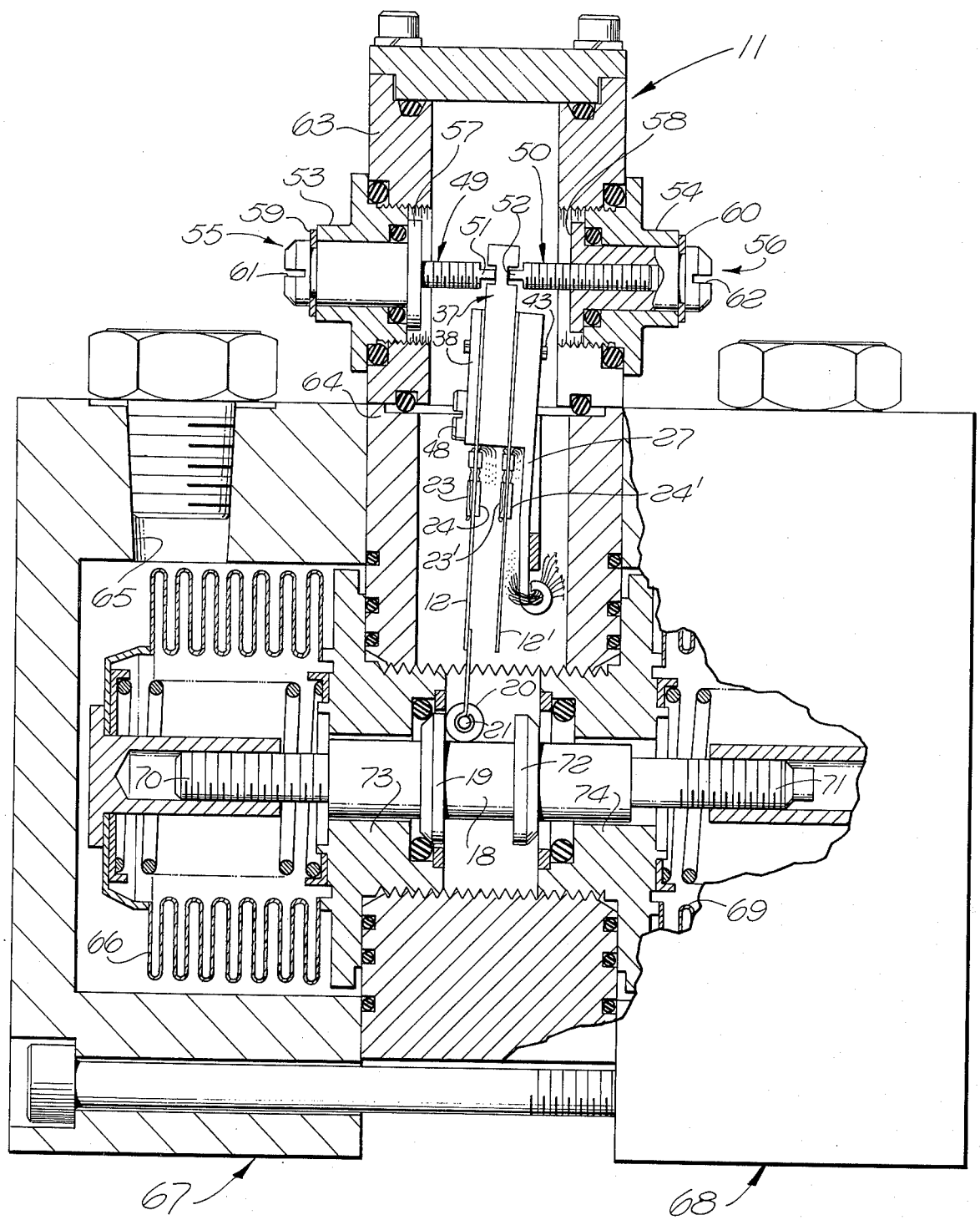
FIG. 2 is a longitudinal sectional view through the transducer taken on the line 2—2 shown in FIG. 1.

As shown in FIG. 2, a valve stem 18 moves in accordance with differential pressure. A flange 19 is fixed to valve stem 18. Flange 19 engages a roller 20 which is fixed to shaft 21 that is journaled in a clevis part of strain gage beam 12. This arrangement is shown in all three of FIGS. 1, 2 and 3.

As shown in FIG. 2, strain gages 23 and 24 are fixed to opposite sides of beam 12.

Figure 3:
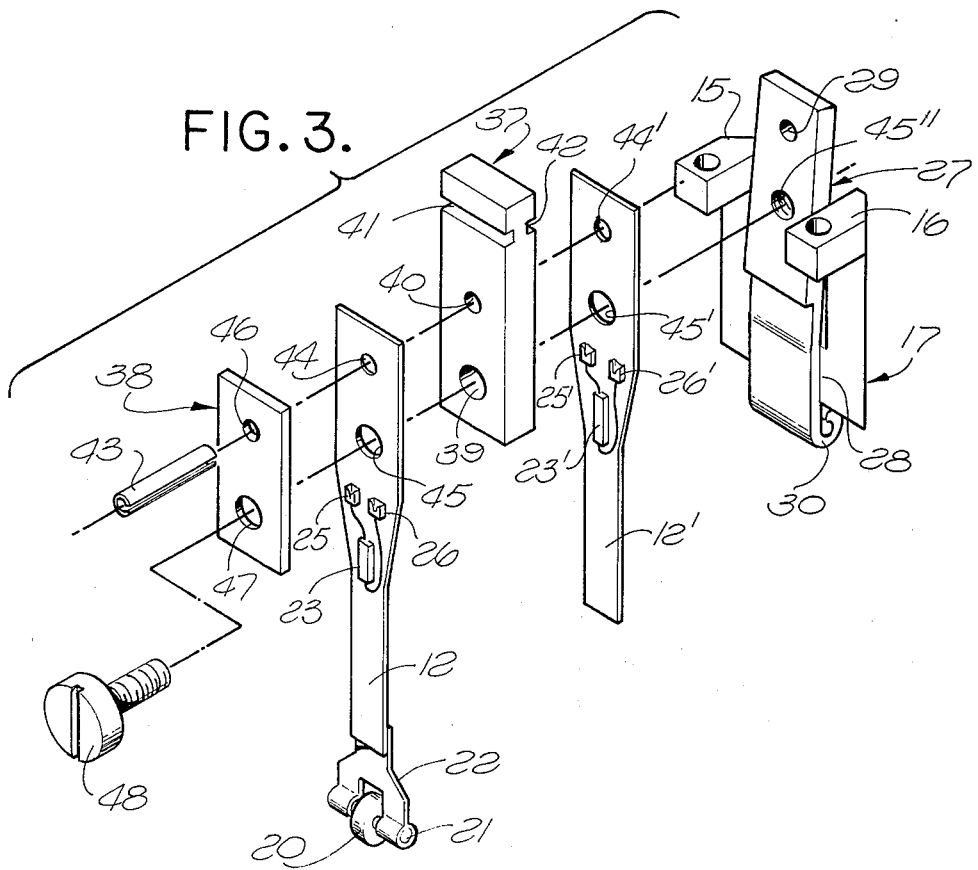
FIG. 3 is an exploded perspective view of two strain gage beams and an adjustable mounting therefor.

As shown in FIG. 3, electrical contacts 25 and 26 are provided for the electrical leads from strain gage 23. Similar contacts may be provided for strain gage 24.

Another cantilever leaf spring 27 is fixed to the portion 28 of member 17 as shown in FIG. 3. Beam 27 has a threaded hole 29 therethrough and a curled end 30 through which eight electrical leads extend from all the strain gage contacts for the strain gages 23, 24, 23' and 24' to eight pins 31, shown in FIG. 1. Pins 31 are sealed through a glass disc 33 in a ring 34 that seats into body 11 and is held in place by a threaded cylinder 35.

An electrical connector 36 is plugged onto those portions of the pins 31 which project beyond disc 33 to the left thereof, as viewed in FIG. 1.

As shown in FIGS. 2 and 3, block 37 is located contiguously between beams 12 and 12'.

A plate 38 is located contiguous to beam 12.

In actual practice, beam 27 is first brazed to member 17. Block 37 has a hole 39, and a hole 40. Block 37 also has grooves 41 and 42.

The entire assembly of FIG. 3 is held together by a pin 43 and a screw 48. Pin 43 is press-fit into the registering holes 46, 44, 40, 44' and 29.

To complete the assembly, holes 47, 45, 39 and 45' are located around screw 48 and screw 48 is threaded into a hole 45" in beam 27.

As shown in FIG. 2, threaded shafts 49 and 50 have screwdriver projections 51 and 52, respectively, to fit in block notches 41 and 42, respectively.

On each side of the body 11, ferrules 53 and 54 hold the structure internal thereof in place. The structure internal of ferrule 53 is identical to that shown inside ferrule 54. Shafts 49 and 50 move axially but do not rotate. They are moved axially by turning fixed nuts 55 and 56. Nuts 55 and 56 have flanges 57 and 58 which prevent movement of nuts 55 and 56 outwardly of body 11. Snap rings 59 and 60 prevent movement of nuts 55 and 56 inwardly of body 11. Nuts 55 and 56 have screwdriver slots 61 and 62 by which they may be turned.

In accordance with the foregoing, the position of beams 12, 27 may be adjusted by first moving one or both nuts 55 and 56 so that there is some play or permitted movement of block 37 relative to shafts 49 and 50. One of the nuts 55 and 56 may thus be turned to move both beam 27 and beam 12. This causes beam 27 to bend near the portion 28 of member 17 in FIG. 3. Beams 12, 12' and 27 thus all act as cantilever beams; however, beam 12' is not moved by axial movement of valve stem 18. The upper ends of beams 12 and 12' are fixed relative to the upper end of beam 27.

When the block 37 has been located, nuts 55 and 56 are turned to cause block 37 to be squeezed between the shaft projections 51 and 52, and to be jammed or frozen therebetween. Thus, even though the location of beam 12 is adjustable, its position can be fixed after it has been adjusted. Moreover, when the position of beam 12 is fixed, the threads of shafts 49 and 50 are, more or less, jammed so that the location of beam 12 will not be easily changed after it has been adjusted and fixed.

Body portion 11 principally includes an upper portion 63 shown in FIG. 2 and a lower portion 64. Except as described herein previously, all of the structure outside of lower portion 64 below its upper end may be any entirely conventional differential pressure unit. However, the invention is not limited to the measurement of differential pressure.

In FIG. 2, the pressure of a fluid may be introduced at a port 65 surrounding a metal bellows 66. Port 65 is provided through an end bell 67. The right-hand half of the unit also includes an end bell 68 which may be provided with a port similar to port 65. The right-hand half may also include a metal bellows 69. Valve stem 18 may be fixed to one end of each of the bellows 66 and 69 by threaded connections 70 and 71 therethrough, if desired. Flanges 19 and 72 protect the unit in the event of overpressure, as is conventional.

As is conventional, an incompressible fluid completely fills the interior of body 11, bellows 66 and bellows 69. The shaft of valve stem 18 may also be smaller than the clearance with parts 73 and 74 so that the pressure inside the bellows 66 and 69 is the same as that throughout the interior of body 11.

In FIG. 4, the strain gages 23, 24, 23' and 24' are indicated by variable resistors. A supply voltage of between 22 and 80 volts D.C. may be supplied by a D.C. source of potential 75. A load is indicated at 76 having output terminals 77 and 78 connected across utilization means 75'.

Utilization means 75' may be a voltmeter calibrated in pressure, a process controller or otherwise.

An output is provided which is a current that is a function of differential pressure. This current is supplied through resistor 76. Since the device of the present invention is essentially current sensitive, the leads 79 and 80 may be of any length, yet, the accuracy of the output signal will not be affected.

A diode 81 is connected in series with source 75 to protect the circuit in the event that the source 75 is connected with the wrong polarity. A dotted box 82 may be any entirely conventional voltage regulator. Circuit 82 includes transistors 83 and 84; zener diodes 85, 86 and 87; a capacitor 88; and resistors 89, 90, 91 and 92.

An entirely conventional differential amplifier is indicated at 93 connected from a bridge 94. Amplifier 93 has a non-inverting input connected from a wiper 95 of a potentiometer 96 through a resistor 97. Potentiometer 96 has a winding 98. A first corner of the bridge is located at a junction 100. A second corner of the bridge is located at the point of contact of wiper 95 on winding 98. A third corner of the bridge is located at junction 101. A fourth corner of the bridge is located at a junction 99.

A resistor 102 is connected from a positive junction 103 to junction 100. A resistor 104 is connected from junction 101 to a negative junction 105.

Amplifier 93 has an inverting input connected from junction 99 through resistors 106 and 107 in series in succession in that order.

A first leg of the bridge includes potentiometer 96 with a resistor 108 connected in parallel with winding 98 thereof, strain gage 24 and resistors 109 and 110.

A second leg of the bridge includes potentiometer 96, resistor 108, strain gage 23 and a resistor 111.

A third leg of the bridge includes a resistor 23'. Still another fourth leg of the bridge includes a resistor 24'.

A positive feedback resistor 114 is connected from a junction 115 to a junction 116. A negative feedback resistor 117 is connected from a junction 118 to a junction 119'. One of the resistors 114 and 117 is always omitted, as will be explained.

Diodes 119 and 120 are connected from the output of amplifier 93 to the base 121 of transistor 122 having a collector 123 and an emitter 124. Transistor 122, and transistors 125 and 126 are all three connected as emitter followers. Transistor 122 has an emitter resistor 127 connected therefrom. Similarly, transistors 125 and 126 have emitter resistors 128 and 129 connected therefrom, respectively. A resistor 130 is connected from a common junction 131 of resistors 128 and 129 to a negative junction 132.

Resistors 133, 134, 135 and 136 with a variable resistor 137 form a feedback circuit to the inverting input of amplifier 93 from a junction 138.

A resistor 135' is connected from a junction 135'' to junction 103.

A resistor 139 is connected from a junction 140 to a negative junction 141. A resistor 142 is connected from a junction 143 to junction 119'.

A number of additional resistors are illustrated in FIG. 4 for tailoring purposes. Two of these resistors are indicated at 144 and 145.

The resistance of resistor 144 is selected to produce a predetermined voltage at the output of amplifier 93 at room temperature for a full scale deflection of beam 12.

The resistance of resistor 145 is selected to correct for any change in span with temperature. The change in span is first measured by shorting out resistor 145. The output of amplifier 93 is then measured four times. It is measured for the zero deflection of beam 12 at room temperature. It is measured for the full scale deflection of beam 12 at room temperature. It is measured for zero deflection at, say 100°F. it is again measured for full scale deflection at 100°F.

Span is defined as the difference between the full scale and zero outputs of amplifier 93. If the span for room temperature is different from that for 100°F., resistor 145 is selected to have a resistance to make the room temperature span equal to the span at 100°F.

One of the resistors 109 and 111 is temperature sensitive and has a positive temperature coefficient. The other of the resistors 109 and 111 is not temperature sensitive. The resistors 109 and 111 are employed to compensate for a zero shift with temperature.

Initially, resistors 109 and 111 are shorted out. The wiper 95 of potentiometer 96 is then adjusted at room temperature to produce a zero output from amplifier 93. The temperature is then varied to determine the magnitude and sign of the zero shift error. Resistors 109 and 111 are then selected to have values to null out the zero shift, and the shorts thereacross removed.

Resistor 145 is a temperature sensitive resistor. Resistor 146 is not a temperature sensitive resistor.

Variable resistor 137 fits the full scale or output voltage of amplifier 93 for the maximum deflection of beam 12.

Resistors 114 and 117 are used to correct for nonlinearity. Only one of the resistors 114 and 117 is used at a time.

The strain gages 23, 24, 23' and 24' are bonded to their respective beams with a thin sheet of glass. See U.S. Pat. No. 3,713,068.

An increase in the potential of the non-inverting amplifier input causes an increase in the output thereof when the inverting input thereof is maintained constant. A decrease in the non-inverting input potential causes the output of the amplifier to decrease when the inverting input remains constant. Conversely, when the inverting input rises and the non-inverting input remains constant, the output decreases. When the inverting input falls and the non-inverting input is constant, the output rises.

The point of contact of wiper 95 on winding 98 is hereby defined for use herein and in the claims to include, but not be limited to, a "bridge corner" or a "junction."

Due to the fact that tailoring may or may not be needed, many of the resistors disclosed in the circuit of FIG. 4 may be omitted or shorted, as desired.

For use herein, the junction 105 is hereby defined as "circuit ground" whether or not junction 105 is in fact grounded.

For the span compensation provided by resistors 145 and 146, the resistances of resistors 145 and 146 may be such that, $$V_{ofr} - V_{ofd} = 0$$

where, $$V_{ofr} = V_{fr} - V_{or},$$

and $$V_{ofd} = V_{fd} - V_{od},$$

where,

- $V_{fr}$ is the difference of potential between wiper 95 and junction 99 at room temperature when beam 12 is deflected full scale,
- $V_{or}$ is the difference of potential between wiper 95 and junction 99 at room temperature when the deflection of beam 12 is zero,
- $V_{fd}$ is the difference of potential between wiper 95 and junction 99 at a predetermined temperature different from room temperature when beam 12 is deflected full scale, and
- $V_{od}$ is the difference of potential between wiper 95 and junction 99 at the said predetermined temperature when the beam 12 has a zero deflection.

For good static pressure compensation, beams 12 and 12' may be substantially identical, if desired, and strain gages 23, 24, 23' and 24' may all be substantially identical, if desired.

What is claimed is:

1. A static pressure compensated transducer comprising: a base; first and second cantilever leaf spring beams each having one end fixed relative to said base; means to move the other end of said first beam in a direction approximately normal to the plane thereof, the other end of said second beam being suspended freely from said base in a stationary position independent of the position and movement of the other end of said first beam; a Wheatstone bridge having first, second, third and fourth legs and first, second, third and fourth conductive corners, said first, second, third and fourth legs being connected between said first and second, second and third, third and fourth, and fourth and first conductive corners respectively, said corners acting as junctions; first and second strain gages fixed to opposite sides of said first beam between the ends thereof and connected in series in said first and second bridge legs, respectively; third and fourth strain gages fixed to opposite sides of said second beam between the ends thereof and connected in series in said third and fourth bridge legs, respectively; means to supply different potentials to said first and third bridge corners; and output means connected from and responsive to a difference of potential between said second and fourth corners to produce an output signal which is a function of the magnitude of the movement of the said other end of said first beam, said base defining a chamber having a fluid therein, both of said beams being fixed to said base in positions extending into the self-same said chamber and being subjected to the fluid pressure in said chamber, said function being less sensitive to changes in said fluid pressure than it would be were said second beam and said third and fourth strain gages isolated from said chamber.

2. The invention as defined in claim 1, including utilization means connected from said output means to receive said output signal thereof.

3. The invention as defined in claim 2, wherein said utilization means includes a voltmeter calibrated in pressure.

4. The invention as defined in claim 3, wherein said beams are substantially identical and said strain gages are all substantially identical.

5. The invention as defined in claim 1, wherein said beams are substantially identical and said strain gages are all substantially identical.

6. The invention as defined in claim 2, wherein said beams are substantially identical and said strain gages are all substantially identical.

* * * * *